(12) United States Patent
Fujikata et al.

(10) Patent No.: US 9,548,818 B2
(45) Date of Patent: Jan. 17, 2017

(54) OPTICAL MODULATOR AND OPERATING POINT CONTROL METHOD

(71) Applicant: NEC Corporation, Minato-ku, Tokyo (JP)

(72) Inventors: Junichi Fujikata, Tokyo (JP); Shigeki Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 9 days.

(21) Appl. No.: 14/665,180

(22) Filed: Mar. 23, 2015

(65) Prior Publication Data

US 2015/0280832 A1     Oct. 1, 2015

(30) Foreign Application Priority Data

Mar. 27, 2014 (JP) ................. 2014-067112

(51) Int. Cl.
| | | |
|---|---|---|
| H04B 10/548 | (2013.01) | |
| H04B 10/556 | (2013.01) | |
| H04B 10/079 | (2013.01) | |
| G02F 1/01 | (2006.01) | |
| G02F 1/225 | (2006.01) | |

(52) U.S. Cl.
CPC ......... H04B 10/5561 (2013.01); G02F 1/0123 (2013.01); G02F 1/2257 (2013.01); H04B 10/0795 (2013.01)

(58) Field of Classification Search
CPC ............. H04B 10/50577; H04B 10/548
See application file for complete search history.

(56) References Cited

U.S. PATENT DOCUMENTS

| | | | | |
|---|---|---|---|---|
| 7,848,659 B2 * | 12/2010 | Miura | .................. | G02F 1/0123 398/183 |
| 2009/0274187 A1 | 11/2009 | Kudo et al. | | |
| 2011/0176762 A1 | 7/2011 | Fujikata et al. | | |
| 2011/0229070 A1 | 9/2011 | Doi et al. | | |
| 2012/0003767 A1 | 1/2012 | Fujikata et al. | | |
| 2012/0106888 A1 * | 5/2012 | Goh | ...................... | G02F 1/0327 385/3 |

FOREIGN PATENT DOCUMENTS

| | | |
|---|---|---|
| JP | 10-246899 A | 9/1998 |
| JP | 2006-515082 A | 5/2006 |
| JP | 2013-009136 A | 1/2013 |
| WO | 2007/080891 A1 | 7/2007 |
| WO | 2010/055826 A1 | 5/2010 |
| WO | 2010/064417 A1 | 6/2010 |
| WO | 2010/103891 A1 | 9/2010 |

\* cited by examiner

*Primary Examiner* — Shi K Li

(57) ABSTRACT

An optical modulator includes an optical phase modulator which applies an operating voltage to at least one arm so as to modulate an optical phase of an optical signal transmitted via at least one arm and an optical phase adjuster which applies a voltage below the operating voltage to at least one arm so as to adjust an operating point. In the optical phase adjuster, an optical phase coarse adjuster applies a voltage below the operating voltage to at least one arm so as to change an optical phase of an optical signal by 180° or more, while an optical phase fine adjuster applies a voltage below the operating voltage to at least one arm so as to changer an optical phase of an optical signal by 90° or less. Thus, it is possible to automatically calibrate an operating point of an optical modulator with low power consumption.

8 Claims, 10 Drawing Sheets

OPTICAL MODULATOR AND OPERATING POINT CONTROL METHOD

BACKGROUND OF THE INVENTION

Field of the Invention

The present invention relates to an optical modulator and an operating point control method of an optical modulator.

The present application claims priority on Japanese Patent Application No. 2014-67112, the content of which is incorporated herein by reference.

Description of the Related Art

Optical communication devices operating with wavelengths ranging from 1,310 nm to 1,550 nm have been used for local area networks (LANs) and optical fibers used for household appliances. It is preferable to employ silicon-base optical communication devices in which optical function devices and electronic circuits can be integrated on silicon platforms by way of CMOS technologies.

Silicon-base optical communication devices have been developed and applied to waveguides, optical couplers, wavelength filters, optical modulators, etc. Among them, optical modulators serving as active devices attract attention among engineers. Additionally, it is generally known that Mach-Zehnder interferometers can be applied to optical modulators using changes of refractive indexes. Optical modulators using Mach-Zehnder interferometers are designed to produce optical intensity modulation signals by way of interference using differences of optical phases in arms including two optical waveguides.

Various types of optical devices and optical modulators have been developed and disclosed in various documents. Patent Literature Document 1 discloses an optical phase control circuit which carries out synchronism detection on small modulation components so as to stably control an operating point of an optical modulator. Patent Literature Document 2 discloses a high-speed silicon-base electro-optic modulator. Patent Literature Document 3 discloses an optical waveguide circuit using a Mach-Zehnder interferometer. Patent Literature Documents 4-6 disclose optical modulators. Patent Literature Document 7 discloses a semiconductor laser using optical interference.

FIG. 13 is a schematic illustration showing an example of an optical modulator using a Mach-Zehnder interferometer. The optical modulator includes a first arm 101 and a second arm 102, which are connected to an optical branch structure 103 and an optical coupling structure 104. The optical branch structure 103 is branched into the arms 101 and 102 in the light-input side while the optical coupling structure 104 couples the arms 101 and 102 together in the light-output side. Light input to the optical branch structure 103 is changed in phase while being guided along the arms 101 and 102. Then, optical signals transmitted through the arms 101 and 102 are combined together via the optical coupling structure 104. Both the arms 101 and 102 are silicon-base electro-optic elements which operate based on voltages so that light is changed in phase due to an electro-optic effect or a thermo-optic effect.

Both the arms 101 and 102 have the same length. Without any voltages, no phase differences occur between the arms 101 and 102 so as to superimpose optical signals having the same wavelength, thus maximizing the intensity of light output from the optical coupling structure 104. With a phase difference π occurring between the arms 101 and 102, optical signals transmitted through the arms 101 and 102 are cancelled out when combined together via the optical coupling structure 104, thus minimizing the intensity of light output from the optical coupling structure 104.

Generally speaking, it is possible to maximize an extinction ratio of light by setting an operating point to the intensity of light output from an optical modulator applied with an intermediate voltage between the maximum voltage maximizing the intensity of light and the minimum voltage minimizing the intensity of light. Any one of arms is set to an initial state applied with a voltage causing an optical phase difference corresponding to a half wavelength, and then an operating point (or a reference point) is set to the intensity of light in the initial state. An optical modulator operates based on an operating point so as to output an optical signal. For this reason, it is important to control an operating point constantly. However, it is difficult to stabilize an operating point of an optical modulator due to any changes of environmental temperatures, dispersions of products in manufacturing, and degradation during long-time usage.

Various studies have been carried out to control operating points of optical modulators. Patent Literature Document 1 discloses a technology of controlling an operating point by use of a constant frequency signal superimposed on an operating voltage of a drive circuit causing a phase difference between a first arm and a second arm. Patent Literature Document 5 discloses a technology of controlling an operating point due to a thermo-optic effect using a heater disposed separately from a phase modulator.

For example, operating points may be greatly shifted due to degradation of optical modulators, or operating points may be slightly shifted due to changes of temperatures in optical modulators being driven. The foregoing technologies are unable to control large shifts and small shifts of operating points under low voltages. Additionally, it is difficult to realize optical modulators which can concurrently calibrate large shifts and small shifts of operating points under low voltages.

The technology of Patent Literature Document 1 needs a high voltage above the operating voltage of a drive circuit, causing a phase difference between a first arm and a second arm, since a constant frequency signal is superimposed on the operating voltage of a drive circuit. Since this technology needs to increase the operating voltage of a drive circuit; it is impossible to control an operating point under a low voltage. Additionally, increasing the frequency of a frequency signal superimposed on the operating voltage of a drive circuit may affect the accuracy of phase modulation. In short, this technology is able to solely control a small shift in an operating point of an optical modulator.

The technology of Patent Literature Document 5 utilizing a thermo-optic effect may involve a high phase-change ratio relative to the operating voltage so as to control a large shift in an operating point of an optical modulator. Due to a high phase-change ratio relative to the operating voltage, it is impossible to accurately calibrate a small shift at an operating point of an optical modulator. This may cause a serious problem in mass-produce devices put on the market. It is possible to produce trial products causing high phase-change ratio relative to operating voltages. In trail products, it is possible to calibrate small shifts at operating points by accurately controlling operating voltages. However, it is unpractical to accurately control operating voltages in mass-produce devices put on the market.

CITATION LIST

Patent Literature

Patent Literature Document 1: Japanese Patent Application Publication No. 2013-9136

Patent Literature Document 2: Japanese Patent Application Publication No. 2006-515082
Patent Literature Document 3: Japanese Patent Application Publication No.
Patent Literature Document 4: WO 2010/103891A1
Patent Literature Document 5: WO 2010/064417A1
Patent Literature Document 6: WO 2010/055826A1
Patent Literature Document 7: WO 2007/080891A1

SUMMARY OF THE INVENTION

It is an object of the present invention to provide an optical modulator and an operating point control method for controlling an operating point of an optical modulator under a low voltage.

In a first aspect, the present invention is directed to an optical modulator including an optical branch structure which branches an input light into two optical signals via two arms; an optical phase modulator which applies an operating voltage to at least one arm so as to modulate an optical phase of an optical signal transmitted via at least one arm; an optical phase adjuster which applies a voltage below the operating voltage to at least one arm so as to adjust an operating point; and an optical coupling structure which combines optical signals output from the optical phase adjuster so as to produce an output light. The optical phase adjuster includes an optical phase coarse adjuster and an optical phase fine adjuster. The optical phase coarse adjuster applies a voltage below the operating voltage to at least one arm so as to change an optical phase of an optical signal transmitted via at least one arm by 180° or more. The optical phase fine adjuster applies a voltage below the operating voltage to at least one arm so as to changer an optical phase of an optical signal transmitted via at least one arm by 90° or less.

In a second aspect, the present invention is directed to an optical modulation device comprising an optical modulator having the above configuration. The optical modulation device further includes a power source configured to apply the operating voltage to the optical phase modulator of the optical modulator; a coarse-adjustment power source configured to apply a voltage below the operating voltage to the optical phase coarse adjuster of the optical modulator; a fine-adjustment power source configured to apply a voltage below the operating voltage to the optical phase fine adjuster of the optical modulator; and a monitor configured to monitor a shift of an operating point of the optical modulator in the output light.

In a third aspect, the present invention is directed to an operating point control method adapted to an optical modulator having the above configuration. The operating point control method includes an optical branch step configured to branch an input light via two arms; an optical modulation step configured to apply an operating voltage to an optical waveguide formed in at least one arm so as to change an optical phase of an optical signal transmitted via at least one arm; an optical coupling step configured to recombine optical signals undergoing phase changes while being transmitted through the two arms, thus outputting an output light; a measurement step configured to measure a shift of an operating point of the optical modulator by monitoring part of the output light; an optical phase coarse adjustment step configured to apply a voltage below the operating voltage to the optical waveguide formed in at least one arm so as to change an optical phase of an optical signal transmitted via at least one arm by 180° or more, thus coarsely calibrating the operating point of the optical modulator based on the shift of the operating point measured in the measurement step; and an optical phase fine adjustment step configured to apply a voltage below the operating voltage to the optical waveguide formed in at least one arm so as to change an optical phase of an optical signal transmitted via at least one arm by 90° or less, thus finely calibrating the operating point of the optical modulator based on the shift of the operating point measured in the measurement step.

According to the present invention, it is possible to calibrate any shifts occurring in an operating point of an optical modulator by use of a low voltage below an operating voltage. Thus, it is possible to realize an optical modulator with low power consumption at low cost. Additionally, it is possible to produce an optical modulation device using an optical modulator while automatically calibrating an operating point of an optical modulator with simple processes.

BRIEF DESCRIPTION OF THE DRAWINGS

These and other objects, aspects, and embodiments of the present invention will be described in more detail with reference to the following drawings.

DESCRIPTION OF THE PREFERRED EMBODIMENT

The present invention will be described in further detail by way of examples with reference to the accompanying drawings.

Figure 1:
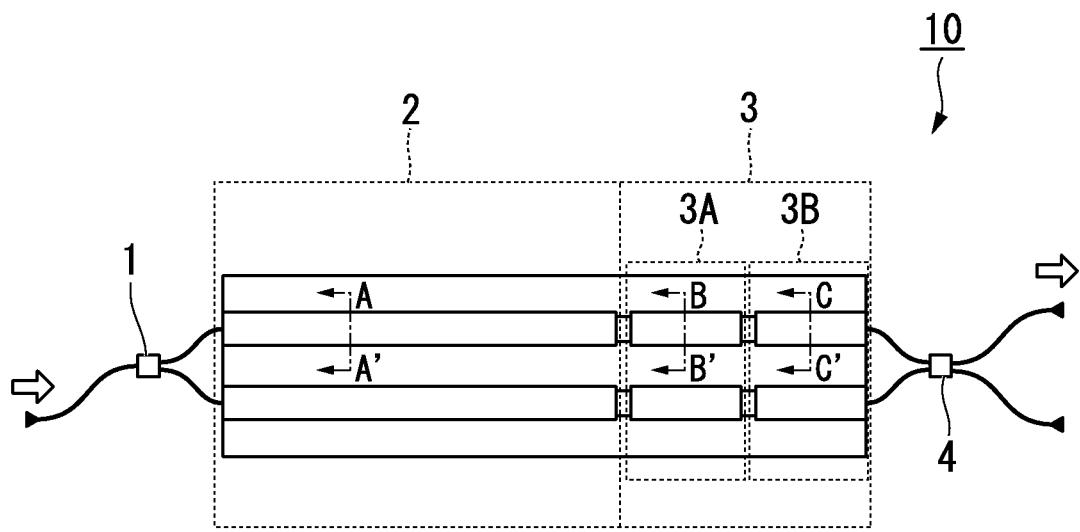
FIG. 1 is a schematic illustration of an optical modulator according to one embodiment of the present invention.

FIG. 1 is a schematic illustration of an optical modulator 10 according to one embodiment of the present invention. The optical modulator 10 includes an optical branch structure 1 which branches light into two arms in the light-input side, an optical phase modulator 2 which applies the operating voltage of a drive circuit (not shown) to at least one of two arms so as to modulate the phase of light, an optical phase modulator 3 which is connected in series to the optical phase modulator 2 so as to adjust an operating point, and an optical coupling structure 4 which complies optical signals, output from the optical phase modulator 3, in the light-output side. The optical phase modulator 3 includes an optical phase coarse adjuster 3A and an optical phase fine adjuster 3B. The optical coarse adjuster 3A is designed to change the optical phase with an angle of 180° or more by applying a voltage, below the operating voltage of a drive circuit, to at least one arm, while the optical phase fine adjuster 3B is designed to change the optical phase with an angle of 90° or less by applying a voltage, below the operating voltage of a drive circuit, to at least one arm.

The optical phase coarse adjuster 3A provides a large phase-change value relative to the applied voltage while the optical phase fine adjuster 3B provides a small phase-change value relative to the applied voltage. With the same applied voltage, the optical phase coarse adjuster 3A causes a large phase change while the optical phase fine adjuster 3B causes a small phase change. Owing to the optical phase modulator 3 including the optical phase coarse adjuster 3A and the optical phase fine adjuster 3B, it is possible to calibrate a large shift of an operating point and a small shift of an operating point under the predetermined applied voltage.

Specifically, the optical phase coarse adjuster 3A is able to change the optical phase with an angle of 180° or more by applying a voltage, below the operating voltage of a drive circuit configured to drive the optical phase modulator 2, to at least one arm. Thus, it is possible to calibrate a large shift of an operating point due to an extinction property of light intensity. In contrast, the optical phase fine adjuster 3B is able to change the optical phase with an angle of 90° or less by applying a voltage, below the operating voltage of a drive circuit configured to drive the optical phase modulator 2, to at least one arm. Thus, it is possible to accurately calibrate a small shift of an operating point due to any variation of an environmental temperature at a high-speed drive mode.

Both the optical phase coarse adjuster 3A and the optical phase fine adjuster 3B operate based on a voltage below the operating voltage of a drive circuit for the optical phase modulator 2, wherein it is possible to calibrate a large shift of an operating point and a small shift of an operating point. For this reason, the optical modulator 10 does not need a high power source outputting a high voltage above the operating voltage of a drive circuit for the optical phase modulator 2. In other words, it is unnecessary to connect a high power source to the optical modulator 10, which is thus superior in power consumption and cost performance.

Due to a large optical phase-change value relative to the applied voltage of the optical phase coarse adjuster 3A, the optical phase coarse adjuster 3A may hardly calibrate various shifts of an operating point because it causes a relatively large optical phase change based on a small voltage variation. Therefore, the optical phase coarse adjuster 3A alone is unable to accurately calibrate an operating point.

Due to a small optical phase-change value relative to the applied voltage of the optical phase fine adjuster 3B, the optical phase fine adjuster 3B may hardly calibrate various shifts of an operating point; hence, the optical phase fine adjuster 3B needs a high voltage to calibrate an operating point. This is because it is necessary to cause a large phase change in order to calibrate a large shift of an operating point. The optical phase coarse adjuster 3B, causing a small optical phase-change value relative to the applied voltage, alone cannot cause an adequate phase-change value without a high voltage applied thereto. In this case, it is necessary to use a high operating voltage to control an operating point, which is not preferable in terms of power consumption and cost performance.

In the optical phase adjuster 3, it is possible to arrange the optical phase coarse adjuster 3A and the optical phase fine adjuster 3B for each arm as shown in FIG. 1. It is possible to finely control each arm by means of the optical phase coarse adjuster 3A and the optical phase fine adjuster 3B both arranged for each arm.

Figure 2:
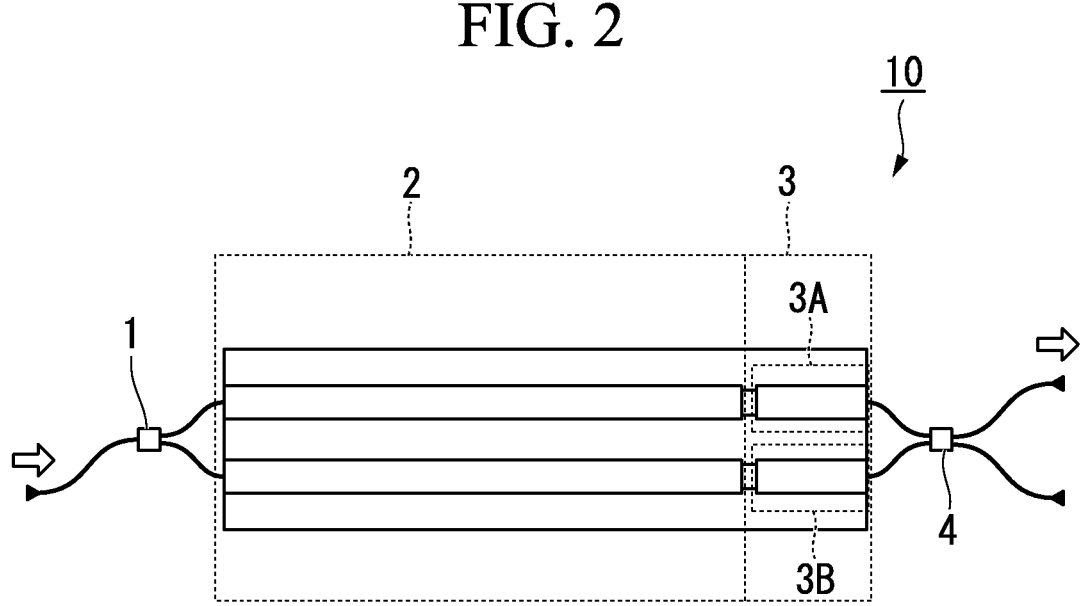
FIG. 2 is a schematic illustration of an optical modulator according to a modification of the embodiment.

In this connection, it is possible to modify the present embodiment as shown in FIG. 2 in which the optical phase coarse adjuster 3A is disposed in one arm while the optical phase fine adjuster 3B is disposed in the other arm. This modification may reduce the number of control terminals, which thus contributes to a high-density integration of components in the optical modulator 10. Additionally, this modification may simplify a control circuit applied to the optical modulator 10.

Figure 3:
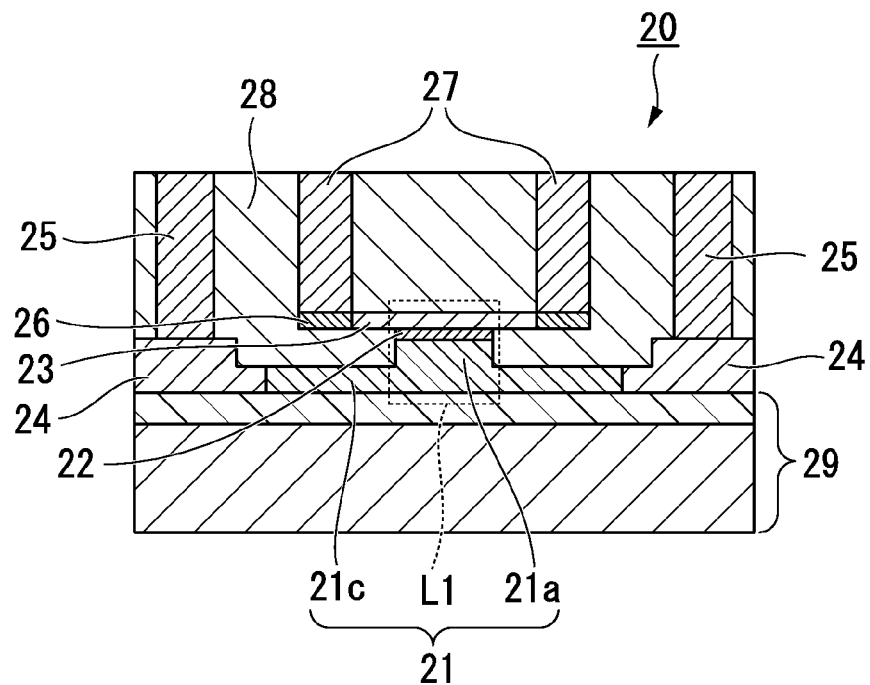
FIG. 3 is a cross-sectional view taken along line A-A' in FIG. 1, showing a silicon-base electro-optic element of an optical phase modulator

FIG. 3 is a cross-sectional view taken along line A-A' in FIG. 1, showing a silicon-base electro-optic element of an optical phase modulator.

FIG. 3 shows a silicon-base electro-optic element 20 of an SIS (Semiconductor-Insulator-Semiconductor) junction type. The SIS-junction silicon-base electro-optic element 20 includes a substrate 29, a first conductive semiconductor layer 21 having a rib waveguide structure 21a rectangularly shaped to project in a direction opposite to the substrate 29, a dielectric layer 22 deposited on the rib waveguide structure 21a, and a second conductive semiconductor layer 23 deposited on the dielectric layer 22. The first conductive semiconductor layer 21 is connected to a first electrode wire 25 via a first contact part 24 which is doped with first-conductive impurities at a higher density than other parts. The second conductive semiconductor layer 23 is connected to a second electrode wire 27 via a second contact part 26 which is doped with second-conductive impurities at a higher density than other parts. The first contact part 24 rectangularly shaped to project towards a slab 21c of the first conductive semiconductor layer 21. The slab 21c corresponds to a non-projected part of the first conductive semiconductor layer 21. A clad layer 28 made of oxides is formed in other regions so as to limit a waveguide part of light.

As the substrate 29 forming an electro-optic element, the present embodiment employs an SOI (Silicon On Insulator) substrate having an oxide film on a silicon substrate; but this is not a restriction. It is possible to use any types of silicon-base substrates.

The SIS-junction silicon-base electro-optic element 20 causes a small phase-change value, having a high linearity, relative to an operating voltage applied thereto. Thus, it is possible to accurately control a phase-change value based on the applied voltage. Additionally, it is possible to exhibit one-to-one correspondence between the optical phase-change value and the applied voltage; this may reduce complexity of an element. Due to a small phase-change value having a high linearity, it is possible to prevent a large shift from occurring in an operating point.

A voltage applied to each arm may change an optical phase of each arm in the optical phase modulator 2. A drive circuit may produce a voltage of 3.3 V with respect to the optical phase modulator 2 using SiGe bipolar transistors. Alternatively, a drive circuit may produce a voltage ranging from 1.0 V to 1.8 V with respect to the optical phase modulator 2 using a CMOS structure. An actual voltage applied to the optical phase modulator 2 changing an optical phase may become lower than the operating voltage of a drive circuit.

The SIS-junction silicon-base electro-optic element 20 utilizes an electro-optic effect (or a free carrier plasma effect). The outline of an optical phase modulation mechanism, i.e. an operating principle of the SIS-junction silicon-base electro-optic element 20, will be described below.

A pure electro-optic effect cannot be obtained or hardly obtained in silicon; hence, an optical phase modulation may utilize a free carrier plasma effect and a thermo-optic effect. Herein, a free carrier plasma may solely suffice the needs of the present invention aiming at a high-speed operation (e.g. a speed of Giga-bits per second or more). The present invention uses changes of refractive indexes in silicon layers, which can be explained using first-order approximations, i.e. Equations 1, 2 as follows.

$$\Delta n = -\frac{e^2\lambda^2}{8\pi^3 c^3 \varepsilon_0 n}\left(\frac{\Delta N_e}{m_e} + \frac{\Delta N_h}{m_h}\right) \quad \text{[Equation 1]}$$

$$\Delta k = -\frac{e^3\lambda^2}{8\pi^3 c^3 \varepsilon_0 n}\left(\frac{\Delta N_e}{m_e^2 \mu_e} + \frac{\Delta N_h}{m_h^2 \mu_h}\right) \quad \text{[Equation 2]}$$

In the above, Equation 1 denotes a real part of a refractive-index change in a silicon layer while Equation 2 denotes an imaginary part of a refractive-index change in a silicon layer, wherein e denotes an electric charge, $\lambda$ denotes a wavelength of light, $\varepsilon_0$ denotes a dielectric constant in vacuum, n denotes a refractive index of a silicon layer, $m_e$ denotes an effective mass of an electron carrier, $m_h$ denotes an effective mass of a hole carrier, $\mu_e$ denotes mobility of an electron carrier, $\mu_h$ denotes mobility of a hole carrier, $\Delta N_e$ denotes a density change of electron carriers, and $\Delta N_h$ denotes a density change of hole carriers.

Various experimental evaluations have been carried out with respect to electro-optic effects in silicon, wherein it is known that Drude equations are consistent with refractive-index changes at carrier densities using wavelengths of 1,310 nm to 1,550 nm used for optical communications. In electro-optic elements using this theory, it is possible to define a phase-change value $\Delta\theta$ via Equation 3.

$$\Delta\theta = \frac{2\pi}{\lambda}\Delta n_{eff} L \quad \text{[Equation 3]}$$

In Equation 3, L denotes the length of an active layer (i.e. an effective modulation region) in an optical propagation direction in a silicon-base electro-optic element while $\Delta n_{eff}$ denotes an effective refractive index which can be obtained from $\Delta n$ and $\Delta k$. According to Equation 3, it is possible to produce a large phase change using a large change of an effective refractive index $\Delta n_{eff}$ irrespective of a short length L of an active layer.

The silicon-base electro-optic element 20 includes the rib waveguide structure 21a by which the optical waveguide may overlap with a region causing a change of a refractive index; hence, it is possible to increase optical modulation efficiency relative to the voltage applied to the silicon-base electro-optic element 20. Thus, it is possible to reduce the length of an active layer subjected to optical modulation, and therefore it is possible to miniaturize optical modulators.

The optical waveguide indicates a region of guiding light. In FIG. 2, the optical waveguide corresponds to a region L1 encompassed by dotted lines. In the SIS-junction silicon-base electro-optic element 20, the optical waveguide embraces the first conductive semiconductor layer 21 (mainly, the rib waveguide structure 21a), the dielectric layer 22, and the second conductive semiconductor layer 23. The region causing a change of a refractive index is a region causing a change of a carrier density in proximity to a junction boundary adjacent to the dielectric layer 22 in the first conductive semiconductor layer 21 and the second conductive semiconductor layer 23.

Due to the formation of the rib waveguide structure 21a, it is possible to reduce the overlap between the optical waveguide and the region doped with impurities at a high density.

The region doped with impurities at a high density (hereinafter, simply referred to a highly doped region) embraces the first contact part 24 and the second contact part 26 in FIG. 1. Herein, dopant may absorb light propagating through the highly doped region. Owing to the rib waveguide structure 21a, it is possible to reduce a loss due to light absorption in the highly doped region.

It is possible to produce a thickness W of a region causing a change in a carrier density (i.e. the maximum thickness of a depletion layer) in the heat balance condition via Equation 4.

$$W = 2\sqrt{\frac{\varepsilon_s kT \cdot \ln(N_c/n_i)}{e^2 N_c}} \quad \text{[Equation 4]}$$

In Equation 4, $\varepsilon_s$ denotes a dielectric constant of a semiconductor layer, k denotes a Boltzmann constant, $N_c$ denotes a carrier density, $n_i$ denotes an intrinsic carrier density, and e denotes an electric charge. When $N_c$ is $10^{17}/cm^3$, for example, the maximum thickness of a depletion layer is about 0.1 μm. An increased carrier density may reduce the thickness of a depletion layer, i.e. the thickness of a region causing a change in a carrier density.

For this reason, it is preferable that the height of the rib waveguide structure 21a be equal to or higher than W. Using the rib waveguide structure 21a with the height above W, it is possible to confine the region causing a change in a carrier density within the rib waveguide structure 21a, thus maintaining large overlap with the optical waveguide.

The first conductive semiconductor layer 21 is connected to the first electrode wire 25 via the first contact part 24 which is doped with first-conductive impurities at a higher density than other regions. Similarly, the second conductive semiconductor layer 23 is connected to the second electrode wire 27 via the second contact part 26 which is doped with second-conductive impurities at a higher density than other regions. High-density doping may reduce contact resistances at the boundary between the first conductive semiconductor layer 21 and the first electrode wire 25 and at the boundary between the second conductive semiconductor layer 23 and the second electrode wire 27. In result, it is possible to reduce series resistance components while reducing RC time constants. This may improve the speed of an optical modulation.

The first contact part 24 rectangularly shaped to project towards the slab 21c of the first conductive semiconductor layer 21. Thus, it is possible to increasing a doping density of the first contact part 24 while reducing contact resistance at the boundary between a semiconductor and a conductor. That is, it is possible to reduce RC time constants, thus increasing the speed of an optical modulation.

Additionally, it is possible to reduce the width of the slab 21c by rectangularly projecting the first contact part 24. Herein, the thickness of the slab 21c is reduced to about 0.1 μm in order to reduce the overlap between the highly doped region and the optical waveguide. However, it is difficult to uniformly reduce the thickness of the slab 21c in a wide area.

It is preferable that each of the first conductive semiconductor layer 21 and the second conductive semiconductor layer 23 be formed using a single layer made of materials selected from among polycrystalline silicon, amorphous silicon, distortion silicon, monocrystalline silicon, and $Si_{1-x}Ge_x$.

The optical phase coarse adjuster 3A may be greatly changed in phase relative to the applied voltage. Specifically, it may cause a phase change of 180° or more relative to the operating voltage of a drive circuit configured to drive the optical phase adjuster 3. For this reason, it is preferable to form the optical phase coarse adjuster 3A by means of a silicon-base electro-optic element using a thermo-optic effect or a carrier injection silicon-base electro-optic element using a carrier plasma effect.

Figure 4:
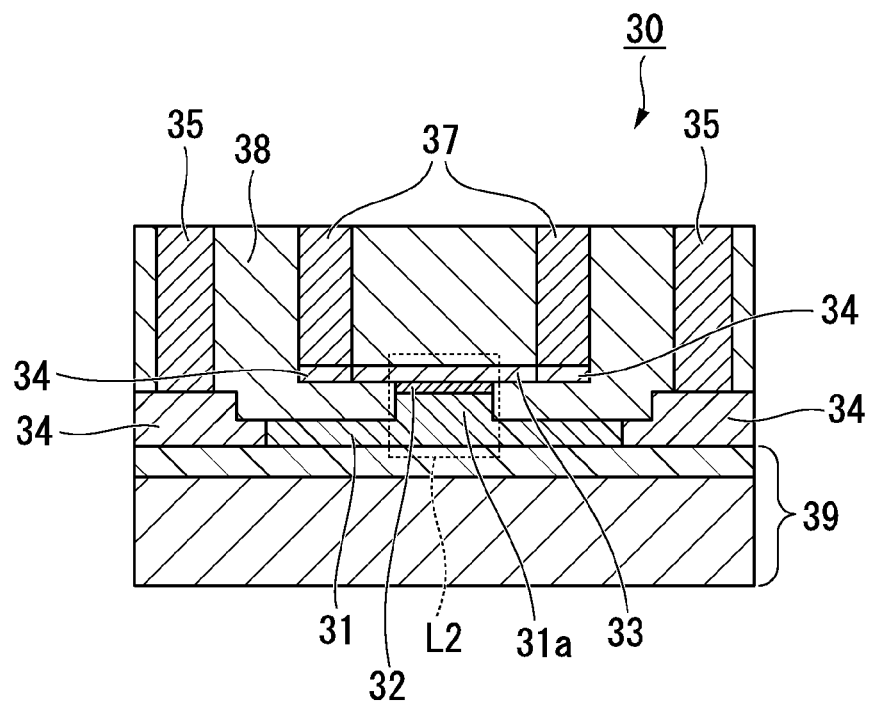
FIG. 4 is a cross-sectional view taken along line B-B' in FIG. 1, showing a silicon-base electro-optic element using a thermo-optic effect.

FIG. 4 is a cross-sectional view taken along line B-B' in FIG. 1, showing a silicon-base electro-optic element 30 using a thermo-optic effect applicable to the optical phase coarse adjuster 3A.

The silicon-base electro-optic element 30 using a thermo-optic effect includes a substrate 39, an intrinsic semiconductor layer 31 having a rib waveguide structure 31a rectangularly shaped to project in a direction opposite to the substrate 39, a dielectric layer 32 deposited on the rib waveguide structure 31a, and a high-resistance polycrystalline semiconductor layer 33 deposited on the dielectric layer 32. The intrinsic semiconductor layer 31 and the high-resistance polycrystalline semiconductor layer 33 are connected to a first electrode wire 35 and a second electrode wire 37 via a contact part 34 which is doped with first-conductive impurities or second-conductive impurities at a higher density than other regions. A clad layer 38 made of oxides is formed in other regions so as to limit the optical waveguide. A voltage applied to the second electrode wire 37 may heat the high-resistance polycrystalline semiconductor layer 33 so as to change a refractive index of the intrinsic semiconductor layer 31. In the silicon-base electro-optic element 30 using a thermo-optic effect, the optical waveguide corresponds to a region L2 encompassed by dotted lines in FIG. 4, which may embrace the intrinsic semiconductor layer 31 (mainly, the rib waveguide structure 31a), the dielectric layer 32, and the high-resistance polycrystalline semiconductor layer 33.

FIG. 4 shows that the dielectric layer 32 contacts the high-resistance polycrystalline semiconductor layer 33; but this is not a restriction. These layers 32 and 33 can be separated from each other. By appropriately adjusting the distance between the layers 32 and 33, it is possible to adjust a phase-change value relative to the applied voltage.

Figure 5:
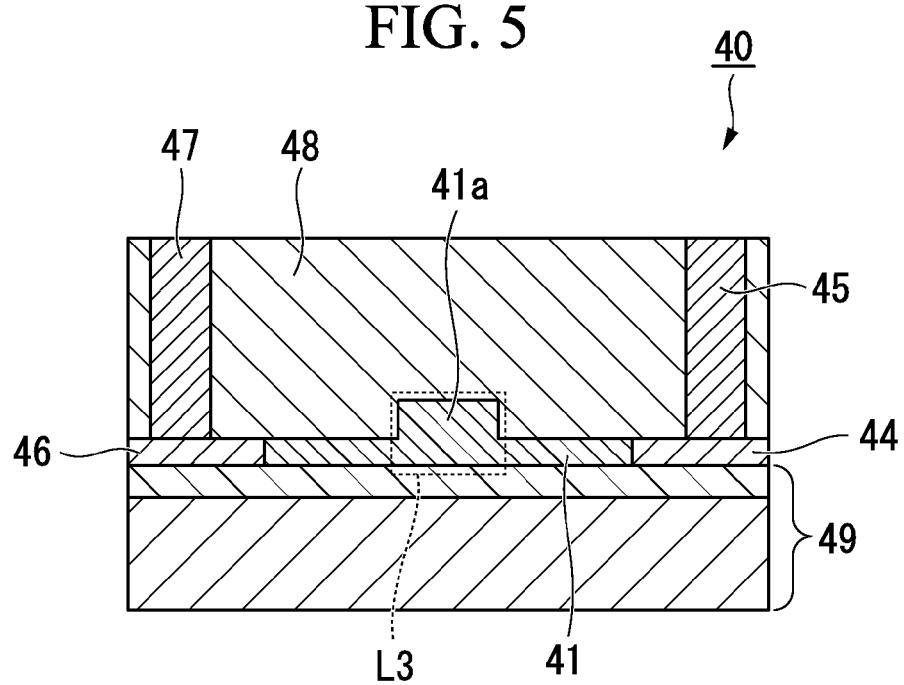
FIG. 5 is a cross-sectional view taken along line B-B' in FIG. 1, showing a carrier injection silicon-base electro-optic element using a carrier plasma effect.

FIG. 5 is a cross-sectional view taken along line B-B' in FIG. 1, showing a carrier injection silicon-base electro-optic element 40 using a carrier plasma effect applicable to the optical phase coarse adjuster 3A.

The carrier injection silicon-base electro-optic element 40 using a carrier plasma effect includes a substrate 49 and an intrinsic semiconductor layer 41 having a rib waveguide structure 41a rectangularly shaped to project in a direction opposite to the substrate 49. A first contact part 44 which is doped with first-conductive impurities at a higher density than other regions is formed in proximity to one end of the intrinsic semiconductor layer 41. The intrinsic semiconductor layer 41 is connected to a first electrode wire 45 via the first contact part 44. A second contact part 46 which is doped with second-conductive impurities at a higher density than other regions is formed in proximity to the other end of the intrinsic semiconductor layer 41. The intrinsic semiconductor layer 41 is connected to a second electrode wire 47 via the second contact part 46. A clad region 48 made of oxides is formed in other regions so as to limit the optical waveguide. A voltage applied between the first electrode wire 45 and the second electrode wire 47 may change a refractive index of the intrinsic semiconductor layer 41 (mainly, the rib waveguide structure 41a). In the silicon-base electro-optic element 40 using a carrier plasma effect, the optical waveguide corresponds to a region L3 encompassed by dotted lines in FIG. 5, which may embrace the intrinsic semiconductor layer 41 (mainly, the rib waveguide structure 41a).

Figure 6:
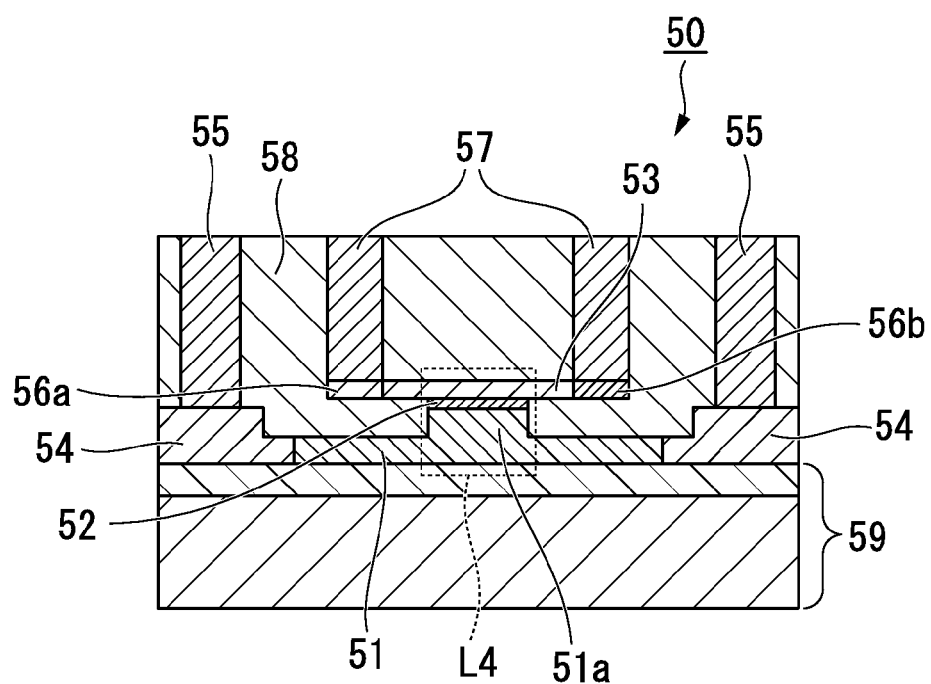
FIG. 6 is a cross-sectional view taken along line B-B' in FIG. 1, showing another example of a carrier injection silicon-base electro-optic element using a carrier plasma effect

FIG. 6 is a cross-sectional view taken along line B-B' in FIG. 1, showing a carrier injection silicon-base electro-optic element 50 using a carrier plasma effect applicable to the optical phase coarse adjuster 3A.

The silicon-base electro-optic element 50 using a carrier plasma effect includes a substrate 59, an intrinsic semiconductor layer 51 having a rib waveguide structure 51a rectangularly shaped to project in a direction opposite to the substrate 59, a dielectric layer 52 deposited on the rib waveguide structure 51a, and a second intrinsic semiconductor layer 53 deposited on the dielectric layer 52. The intrinsic semiconductor layer 51 is connected to first electrode wires 55 via a first contact part 54 which is doped with first-conductive impurities at a higher density than other regions. The second intrinsic semiconductor layer 53 is connected to second electrode wires 57 via a second contact part 56a and a third contact part 56b which are disposed in proximity to the opposite ends of the second intrinsic semiconductor layer 53. The second contact part 56a is doped with first-conductive impurities at a higher density than other regions while the third contact part 56b is doped with second-conductive impurities at a higher density than other regions. A clad layer 58 made of oxides is formed in other regions so as to limit the optical waveguide. A voltage applied between the first electrode wires 55 and the second electrode wires 57 may change refractive indexes of the intrinsic semiconductor layer 51 and the second intrinsic semiconductor layer 53. In the carrier injection silicon-base electro-optic element 50 using a carrier plasma effect, the optical waveguide corresponds to a region L4 encompassed by dotted lines in FIG. 6, which may embrace the intrinsic semiconductor layer 51 (mainly, the rib waveguide structure 51a), the dielectric layer 52, and the second intrinsic semiconductor layer 53.

The optical phase fine adjuster 3B is slightly changed in phase based on the applied voltage. Specifically, the optical phase fine adjuster 3B may cause a phase change of 90° or less relative to the operating voltage of a drive circuit configured to drive the optical phase modulator 2. For this reason, it is preferable that the optical phase fine adjuster 3B be formed by means of a carrier depletion silicon-base electro-optic element using a carrier plasma effect or the SIS junction silicon-base electro-optic element 20 used for the optical phase modulator 2.

In the silicon-base electro-optic element 30 using a thermo-optic effect, it is possible to separate the high-resistance polycrystalline semiconductor layer 33 from the rib waveguide structure 31a. The distance between the high-resistance polycrystalline semiconductor layer 33 and the rib waveguide structure 31a depends on the applied voltage. By modifying the silicon-base electro-optic element 30 such that the high-resistance polycrystalline semiconductor layer 33 is separated from the rib waveguide structure 31a by a distance of 2.0 μm or more with respect to the applied voltage of 1.8 V, for example, it is possible to achieve an optical phase fine adjuster with a phase-change value of 90° or less.

Figure 7:
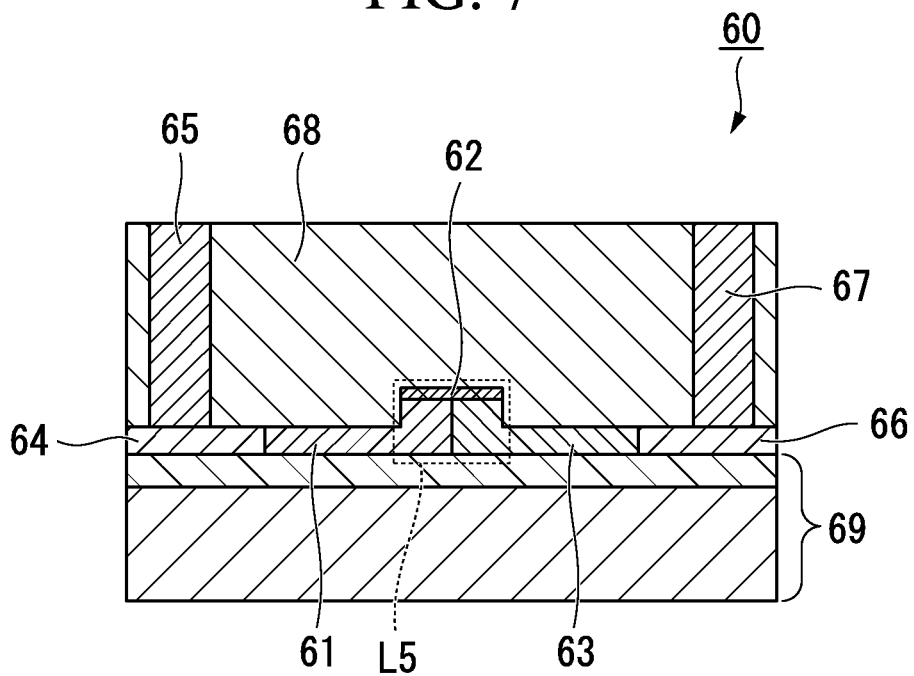
FIG. 7 is a cross-sectional view taken along line C-C' in FIG. 1, showing a carrier depletion silicon-base electro-optic element using a carrier plasma effect.

FIG. 7 is a cross-sectional view taken along line C-C' in FIG. 1, showing a carrier depletion silicon-base electro-optic element 60 using a carrier plasma effect applicable to the optical phase fine adjuster 3B.

In the carrier depletion silicon-base electro-optic element 60 using a carrier plasma effect, a first conductive semiconductor layer 61 horizontally joins a second conductive semiconductor layer 63 above a substrate 69. The first conductive semiconductor layer 61 is coupled with the second conductive semiconductor layer 63 to form a rib waveguide structure rectangularly shaped to project in a direction opposite to the substrate 69. A dielectric layer 62 is deposited on the rib waveguide structure. The first conductive semiconductor layer 61 is connected to a first electrode wire 65 via a first contact part 64 which is doped with first-conductive impurities at a higher density than other regions. The second conductive semiconductor layer 63 is connected to a second electrode wire 67 via a second contact part 66 which is doped with second-conductive impurities at a higher density than other regions. A clad layer 68 made of oxides is formed in other regions so as to limit the optical waveguide. A voltage applied between the first electrode wire 65 and the second electrode wire 67 may change a refractive index via a depletion layer formed at the boundary between the first conductive semiconductor layer 61 and the second conductive semiconductor layer 63. In the carrier depletion silicon-base electro-optic element 60 using a carrier plasma effect, the optical waveguide corresponds to a region L5 encompassed by dotted lines in FIG. 7, which may mainly include the rib waveguide structure formed in the boundary at which the first conductive semiconductor layer 61 joins the second conductive semiconductor layer 63.

The concrete configurations of the optical phase modulator 2 and the optical phase adjuster 3 have been described above. In this connection, it is preferable that the optical phase modulator 2 and the optical phase adjuster 3 be electrically separated from each other but optically connected together. Specifically, it is preferable that the optical waveguide of each arm of the optical phase modulator 2 be separated from the optical waveguide of each arm of the optical phase adjuster 3 while these optical waveguides are connected together via semiconductor materials. Additionally, it is preferable that the optical waveguide of each arm of the optical phase modulator 2 be directed toward the optical phase adjuster 3 while the distal end thereof be shaped to project with a width corresponding to a half wavelength of light or less. Similarly, it is preferable that the optical waveguide of each arm of the optical phase adjuster 3 be directed toward the optical phase modulator 2 while the distal end thereof is shaped to project with a width corresponding to a half width of light or less. Moreover, it is preferable that the projected distal end of the optical waveguide of the optical phase modulator 2 be disposed close to the projected distal end of the optical waveguide of the optical phase adjuster 3 within a distance of effusing evanescent waves.

It is impossible to achieve an optical waveguide function when the optical phase modulator 2 is optically separated from the optical phase adjuster 3. To secure an optical waveguide function, it is necessary to connect the optical phase modulator 2 to the optical phase adjuster 3. Herein, an electric current may unexpectedly flow between the optical phase modulator 2 and the optical phase adjuster 3 depending on a difference between voltages applied to the optical phase modulator 2 and the optical phase adjuster 3. This electric current may cause noise with respect to phase modulation and phase adjustment. Therefore, it is preferable that the optical phase modulator 2 be electrically separated from the optical phase adjuster 3.

Next, an optical modulator in which the optical phase modulator 2 and the optical phase adjuster 3 are electrically separated from each other but optically connected together will be described below. Herein, the optical waveguide of each arm of the optical phase modulator 2 is separated from the optical waveguide of each arm of the optical phase adjuster 3 but these optical waveguides are connected together via semiconductor materials.

FIGS. 8A to 8D show an optical modulator 70 in which the optical phase modulator 2 and the optical phase adjuster 3 are electrically separated from each other but optically connected together.

Figure 8A:
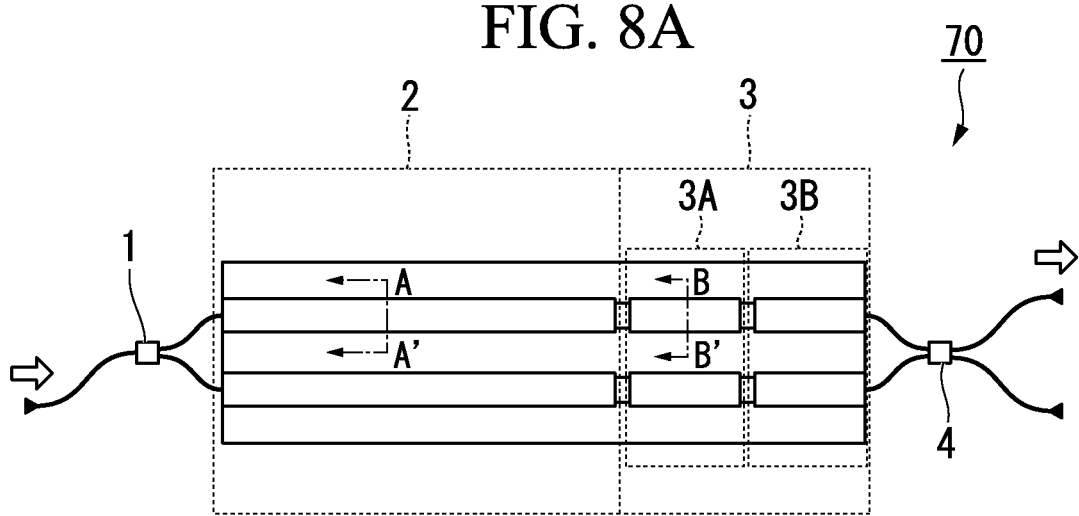
FIG. 8A is a schematic illustration of an optical modulator in which an optical phase modulator and an optical phase adjuster are electrically separated from each other but optical connected together.
Figure 8B:
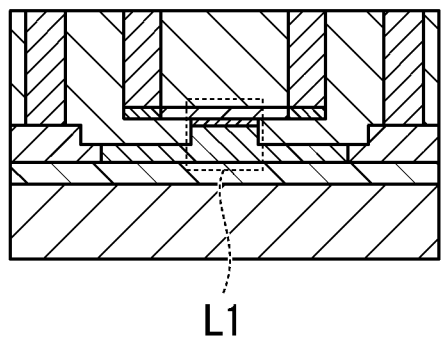
FIG. 8B is a cross-sectional view taken along line A-A' in FIG. 8A.
Figure 8C:
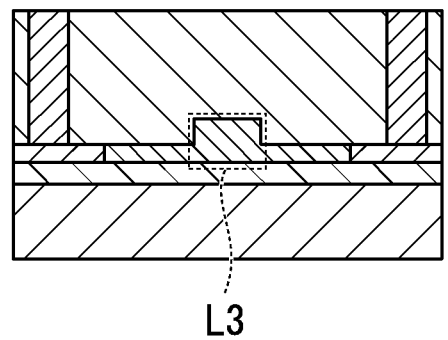
FIG. 8C is a cross-sectional view taken along line B-B' in FIG. 8A.

FIG. 8A is a schematic illustration of the optical modulator 70. FIG. 8B is a cross-sectional view taken along line A-A' in FIG. 8A, showing the optical phase modulator 2. The optical phase modulator 2 is made of the SIS junction silicon-base electro-optic element 20 shown in FIG. 3. FIG. 8C is a cross-sectional view taken along line B-B' in FIG. 8A, showing the optical phase coarse adjuster 3A of the optical phase adjuster 3, deposited adjacent to the optical phase modulator 2. The optical phase coarse adjuster 3A is made of the carrier injection silicon-base electro-optic element 40 using a carrier plasma effect shown in FIG. 5. The optical modulator 70 employs the carrier injection silicon-base electro-optic element 40 as the optical phase coarse adjuster 3A; but this is not a restriction. It is possible to use any types of electro-optic elements applicable to the optical phase coarse adjuster 3A. Additionally, it is possible to modify the optical modulator 70 such that the optical phase modulator 2 adjacently joins the optical phase fine adjuster 3B instead of the optical phase coarse adjuster 3A.

As shown in FIG. 3, the optical waveguide corresponding to the region L1 of the SIS junction silicon-base electro-optic element 20 embraces the first conductive semiconductor layer 21 (mainly, the rib waveguide structure 21a), the dielectric layer 22, and the second conductive semiconductor layer 23. Additionally, the optical waveguide corresponding to the region L3 of the carrier injection silicon-base electro-optic element 40 embraces the intrinsic semiconductor layer 41 (mainly, the rib waveguide structure 41a).

Figure 8D:
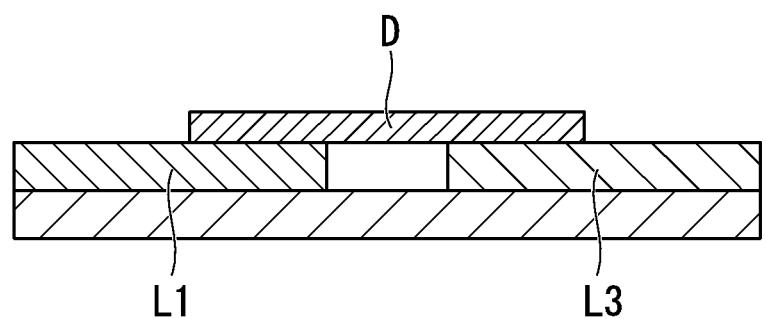
FIG. 8D is a cross-sectional view showing that an optical waveguide of the optical phase modulator is connected to an optical waveguide of the optical phase adjuster.

FIG. 8D is a cross-sectional view schematically showing a junction between the optical waveguide L1 of the SIS junction silicon-base electro-optic element 20 and the optical waveguide L3 of the carrier injection silicon-base electro-optic element 40.

The optical waveguide L1 of the SIS junction silicon-base electro-optic element 20 and the optical waveguide L3 of the carrier injection silicon-base electro-optic element 40 are shaped to mutually project thereto but separated from each other with an arbitrary distance, thus achieving an electric isolation. However, a light waveguide function is broken between the optical waveguide L1 and the optical waveguide L3 which are separated from each other by an arbitrary distance. For this reason, it is necessary to connect the optical waveguides L1 and L3 together via a semiconductor material D having an insulating ability and a light waveguide function. The semiconductor material D having an insulating ability may not affect an electric isolation between the optical waveguides L1 and L3. Herein, it is necessary for the semiconductor material D to demonstrate an insulating ability which may block an electric current from flowing between the optical waveguides L1 and L3 irrespective of a potential difference of several volts applied between the optical waveguides L1 and L3.

An optical signal output from the optical waveguide L1 of the SIS junction silicon-base electro-optic element 20 can be guided to the optical waveguide L3 of the carrier injection silicon-base electro-optic element 40 via the semiconductor material D. For example, it is possible to form the semiconductor material D using a material selected from among polycrystalline silicon, amorphous silicon, distortion silicon, and $Si_{1-x}Ge_x$.

All the optical waveguides are not necessarily connected together, but they need to be partially connected together. Specifically, it is possible to connect the rib waveguide structure 21a or the second conductive semiconductor layer 23 of the SIS junction silicon-base electro-optic element 20 to the counterpart optical waveguide.

Since the dielectric layer 22 of the optical waveguide L1 is formed using the same material as the semiconductor material D, it is possible to connect the optical waveguides L1 and L3 together by simply extending the dielectric layer 22. In this case, it is unnecessary to form a new layer serving as the semiconductor material D configured to connect the optical waveguides L1 and L3 together; hence, it is possible to easily produce an optical modulator.

Next, another example of an optical modulator in which an optical phase modulator and an optical phase adjuster are electrically separated from each other but optically connected together will be described below. Herein, the optical waveguide of each arm of the optical phase modulator is projected towards the optical phase adjuster while the distal end thereof is reduced in width to a half wavelength of light or less. Similarly, the optical waveguide of each arm of the optical phase adjuster is projected towards the optical phase modulator while the distal end thereof is reduced in width to a half wavelength of light or less.

FIGS. 9A to 9E show an optical modulator 80 in which the optical phase modulator 2 and the optical phase adjuster 3 are electrically separated from each other but optically connected together.

Figure 9A:
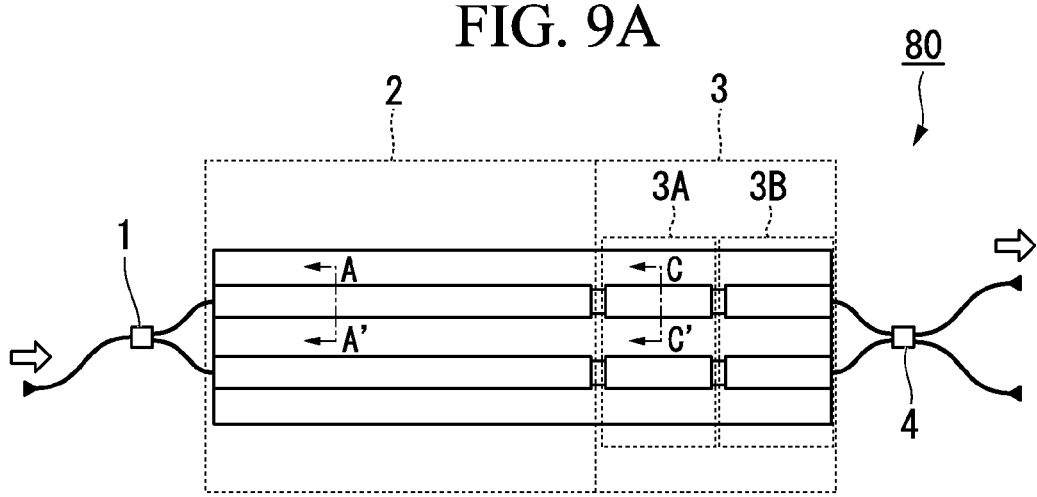
FIG. 9A is a schematic illustration of another example of an optical modulator in which an optical phase modulator and an optical phase adjuster are electrically separated from each other but optically connected together.
Figure 9B:
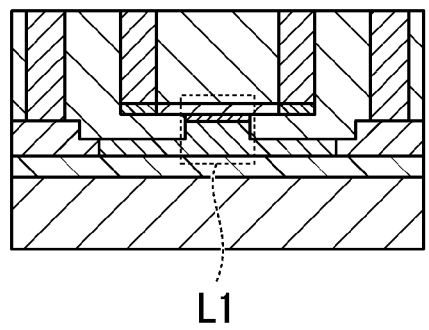
FIG. 9B is a cross-sectional view taken along line A-A' in FIG. 9A.
Figure 9C:
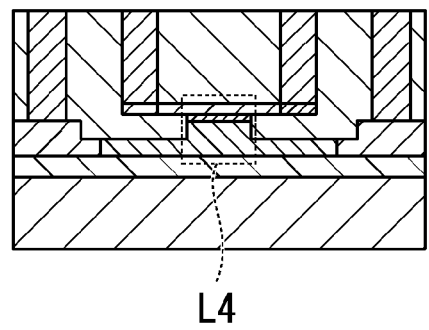
FIG. 9C is a cross-sectional view taken along line C-C' in FIG. 9A.

FIG. 9A is a schematic illustration of the optical modulator 80. FIG. 9B is a cross-sectional view taken along line A-A' in FIG. 9A, showing the optical phase modulator 2. The optical phase modulator 2 is made of the SIS junction silicon-base electro-optic element 20 shown in FIG. 3. FIG. 9C is a cross-sectional view taken along line B-B' in FIG. 9A, showing the optical phase coarse adjuster 3A of the optical phase adjuster 3 adjacently joining the optical phase modulator 2. The optical phase coarse adjuster 3A is made of the carrier injection silicon-base electro-optic element 50 shown in FIG. 6; but this is not a restriction. It is possible to employ any types of electro-optic elements applicable to the optical phase coarse adjuster 3. Additionally, it is possible to modify the optical modulator 80 such that the optical phase modulator 2 adjacently joins the optical phase fine adjuster 3B instead of the optical phase coarse adjuster 3A.

As shown in FIG. 3, the optical waveguide L1 of the SIS junction silicon-base electro-optic element 20 embraces the first conductive semiconductor layer 21 (mainly, the rib waveguide structure 21a), the dielectric layer 22, and the second conductive semiconductor layer 23. As shown in FIG. 6, the optical waveguide L4 of the carrier injection electro-optic element 50 embraces the intrinsic semiconductor layer 51 (mainly, the rib waveguide structure 51a), the dielectric layer 52, and the second intrinsic semiconductor layer 53.

Figure 9D:
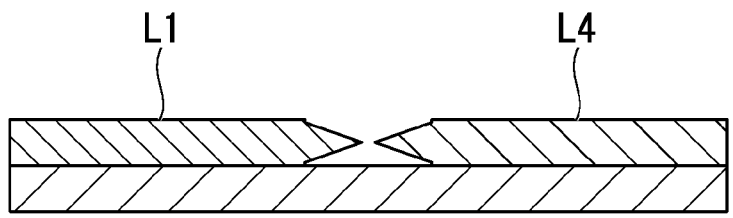
FIG. 9D is a cross-sectional view showing that an optical waveguide of the optical phase modulator is connected to an optical waveguide of the optical phase adjuster.
Figure 9E:
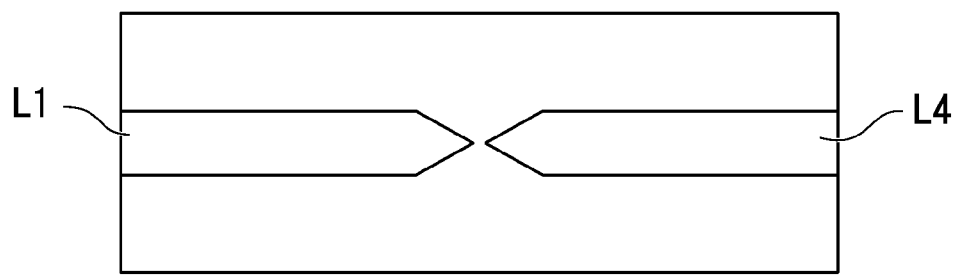
FIG. 9E is a plan view showing that an optical waveguide of the optical phase modulator is connected to an optical waveguide of the optical phase adjuster.

FIG. 9D is a cross-sectional view showing that the optical waveguide L1 of the SIS junction silicon-base electro-optic element 20 is connected to the optical waveguide L4 of the carrier injection silicon-base electro-optic element 50. FIG. 9E is a plan view showing that the optical waveguide L1 of the SIS junction silicon-base electro-optic element 20 is connected to the optical waveguide L4 of the carrier injection silicon-base electro-optic element 50.

The optical waveguide L1 of the SIS junction silicon-base electro-optic element 20 is directed towards the carrier injection silicon-base electro-optic element 50 while the distal end thereof is shaped to project with a width corresponding to a half wavelength of light or less. Similarly, the optical waveguide L4 of the carrier injection silicon-base electro-optic element 50 is directed towards the SIS junction silicon-base electro-optic element 20 while the distal end thereof is shaped to project with a width corresponding to a half wavelength of light or less.

Light incident on the SIS junction silicon-base electro-optic element 20 is transmitted through the optical waveguide L1 and guided towards the projected distal end. The incident light cannot be guided by the distal end whose width is reduced to a half wavelength of light or less, whereas evanescent waves may occur in a region transmitting a wavelength of light or less. Herein, evanescent waves will be reemitted as light when a specific material able to guide light is put close to a region transmitting evanescent waves just before being attenuated. Since the optical waveguide L1 of the SIS junction silicon-base electro-optic element 20 is disposed close to the optical waveguide L4 of the carrier injection silicon-base electro-optic element 50 within a distance of effusing evanescent waves, it is possible to guide the incident light of the SIS junction silicon-base electro-optic element 20 to the carrier injection silicon-base electro-optic element 50 by way of evanescent waves. In contrast, it is possible to block any electric signals from flowing between the electro-optic elements 20 and 50 because their distal ends are physically separated from each other. Owing to the aforementioned structure, it is possible to realize an optical modulator in which an optical phase modulator and an optical phase adjuster are electrically isolated from each other but optically connected together.

The projected part (or the distal end) is not necessarily formed in the entirety of an optical waveguide but can be formed in part of an optical waveguide. Specifically, it is possible to form the projected part in either the rib waveguide structure 21a or the second conductive semiconductor layer 23 in the SIS junction silicon-base electro-optic element 20. Additionally, it is possible to form the projected part in either the intrinsic semiconductor layer 51 or the second intrinsic semiconductor layer 53 in the carrier injection silicon-base electro-optic element 50. Moreover, it is possible to employ the cross-sectional structure of FIG. 9D in which the projected parts are directed to each other in a cross-sectional view or the planar structure of FIG. 9E in which the projected parts are directed to each other in a plan view. Practically, it is preferable to employ the planar structure of FIG. 9E which can be easily manufactured.

Figure 10A:
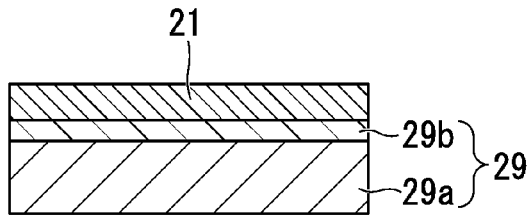
FIG. 10A is a cross-sectional view showing a first step of a manufacturing method of an SIS junction silicon-base electro-optic element.

Next, a manufacturing method of an SIS junction silicon-base electro-optic element 20 will be described with reference to FIGS. 10A to 10G. As shown in FIG. 10A, there is provided a substrate 29 whose thickness ranges from 100 nm to 1,000 nm and in which an embedded oxide film 29b is formed. The substrate 29 is an SOI substrate in which p-type conductivity or n-type conductivity is formed in an area close to a deposition plane (or a lamination plane) rather than the embedded oxide film 29b. It is possible to manufacture the substrate 29 by way of a generally known method; hence, it is possible to purchase a commercial item of an SOI substrate.

A semiconductor layer (i.e. a first conductive semiconductor layer 21) is formed close to the deposition plane of the substrate 29. Herein, the first conductive semiconductor layer 21 can be subjected to impurity doping (or ion injection) using boron, phosphorus, or arsenic before or after manufacturing the substrate 29.

Figure 10B:
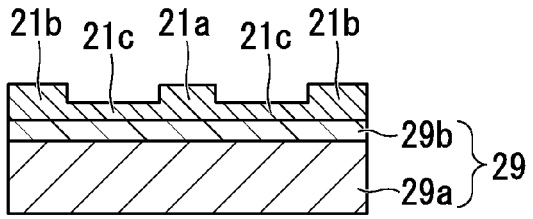
FIG. 10B is a cross-sectional view showing a second step of the manufacturing method of an SIS junction silicon-base electro-optic element.

Next, as shown in FIG. 10B, interregional parts between the rectangular projections 21a and 21b are selectively etched using a photolithography technique, thus forming slabs 21c. Thus, the rectangular projection 21a and the area of the first contact part 24 are each formed in a rectangular shape which projects from other areas.

In the above, it is possible to employ either wet etching or dry etching. Herein, it is necessary to adjust etching conditions such that the area of slab 21c will not be completely removed from the first conductive semiconductor layer 21. It is possible to adjust etching conditions by changing temperatures. It is preferable that the thickness of the slab 21c range from 50 nm to 150 nm.

Figure 10C:
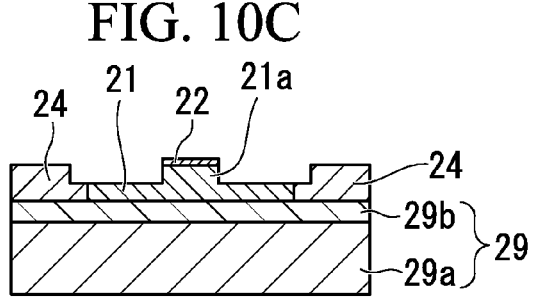
FIG. 10C is a cross-sectional view showing a third step of the manufacturing method of an SIS junction silicon-base electro-optic element.

As shown in FIG. 10C, the rectangular projection 21b of the first conductive semiconductor layer 21 is subjected to ion injection and doped with first-conductive impurities, thus forming the first contact part 24. Thus, it is possible to form the first contact part 24 in which first-conductive impurities are doped at a higher density than other areas. Subsequently, the dielectric layer 22 is deposited on the rib waveguide structure 21a which projects in the first conductive semiconductor layer 21.

Figure 10D:
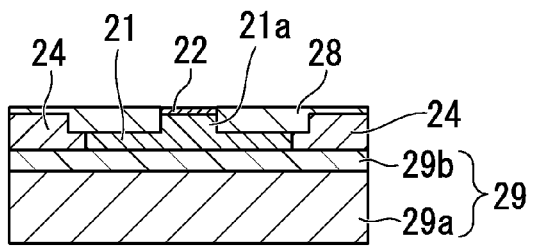
FIG. 10D is a cross-sectional view showing a fourth step of the manufacturing method of an SIS junction silicon-base electro-optic element.

Next, a film forming method such as a plasma CVD (Chemical Vapor Deposition) method is implemented to temporarily form the oxide-film clad layer 28 covering the first conductive semiconductor layer 21 and the dielectric layer 22. As shown in FIG. 10D, the projected parts of the oxide-film clad layer 28 are subjected to planarization and removed using a CMP (Chemical-Mechanical Polishing) method along with the formation of first conductive semiconductor layer 21 and the dielectric layer 22.

Figure 10E:
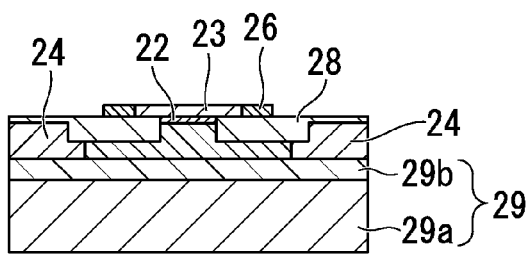
FIG. 10E is a cross-sectional view showing a fifth step of the manufacturing method of an SIS junction silicon-base electro-optic element.

As shown in FIG. 10E, a polycrystalline semiconductor layer is deposited with a thickness of 0.1 μm to 0.3 μm and then subjected to ion injection using second-conductive impurities, thus forming the second conductive semiconductor layer 23. Herein, it is possible to carry out impurity injection during the formation of a polycrystalline semiconductor layer. Additionally, the opposite ends of the second conductive semiconductor layer 23 are subjected to ion injection using second-conductive impurities, thus forming the second contact part 26 which is doped with impurities at a higher density than other areas.

Figure 10F:
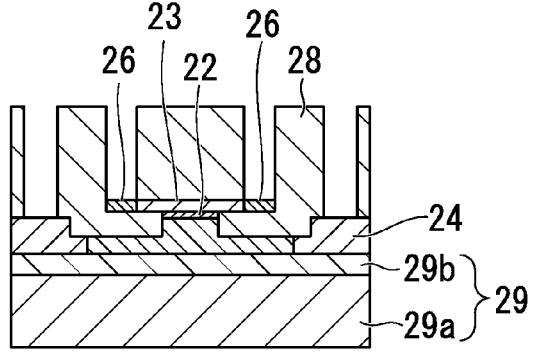
FIG. 10F is a cross-sectional view showing a sixth step of the manufacturing method of an SIS junction silicon-base electro-optic element.
Figure 10G:
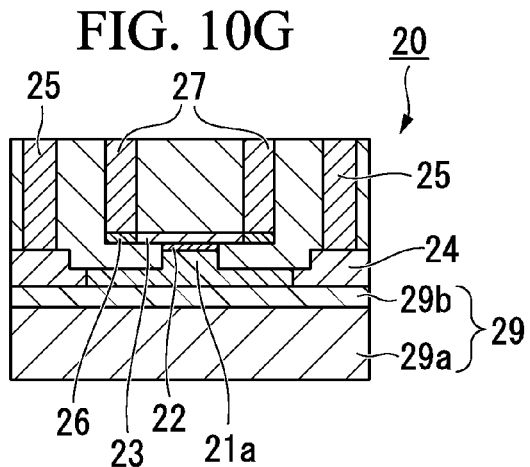
FIG. 10G is a cross-sectional view showing a seventh step of the manufacturing method of an SIS junction silicon-base electro-optic element.

As shown in FIG. 10F, the oxide-film clad layer 28 is deposited again by use of a plasma CVD method, and then contact holes are formed using reactive ion etching. As shown in FIG. 10G, metal layers made of Ti/TiN/Al (Cu) or Ti/TiN/W are formed and embedded in the contact holes by use of a sputtering method or a CVD method. Metal layers extended outside contact holes are patterned using reactive ion etching, thus forming the first electrode wires 25 and the second electrode wires 27. Thus, it is possible to completely produce a silicon-base electro-optic element. Owing to the formation of the first electrode wires 25 and the second electrode wires 27, it is possible to electrically connect a silicon-base electro-optic element to a drive circuit.

Figure 11:
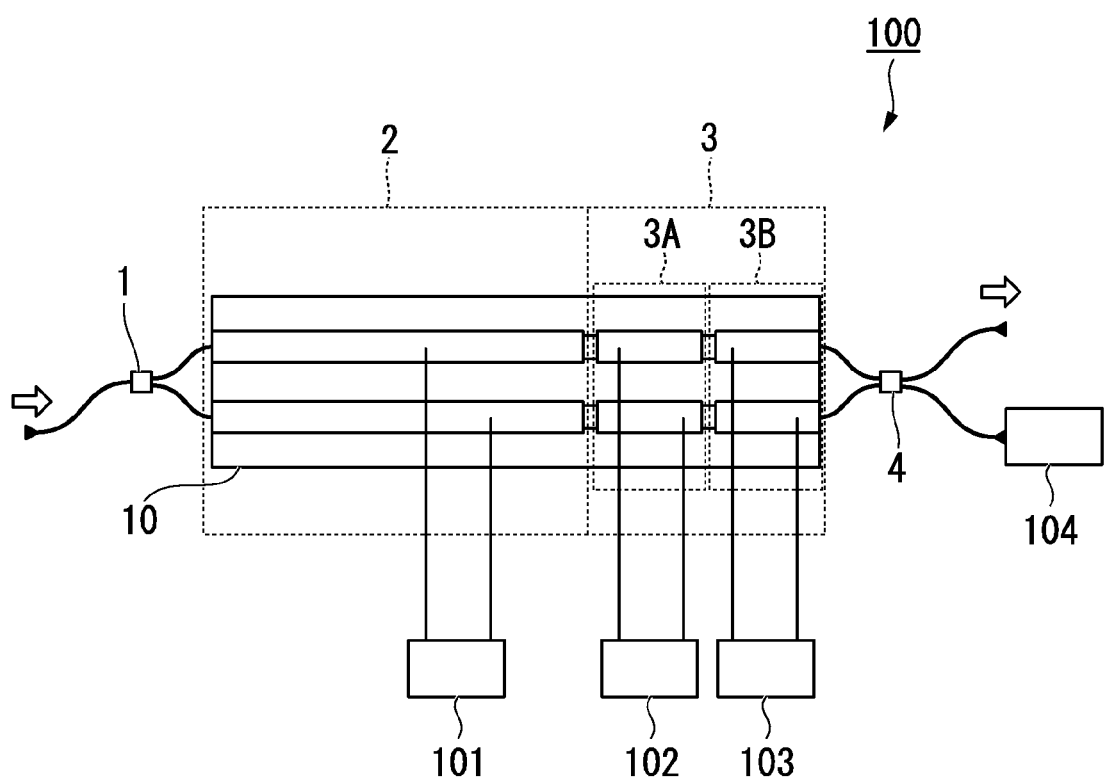
FIG. 11 is a schematic illustration of an optical modulator device including the optical modulator shown in FIG. 1.

FIG. 11 is a schematic illustration of an optical modulation device 100 including the foregoing optical modulator 10. The optical modulation device 100 further includes a power source 101 supplying a voltage to the optical phase modulator 2, a coarse-adjustment power source 102 supplying a voltage to the optical phase coarse adjuster 3A, a fine-adjustment power source 103 supplying a voltage to the optical phase fine adjuster 3B, and a monitor 104 which is used to measure a shift of an operating point of the optical modulator 10 in the light-output side.

The power source 101 applies a voltage to the optical phase modulator 2 so as to change an optical phase of light being guided by the optical modulator 10. At this time, the monitor 104 is used to confirm a shift of an operating point of the optical modulator 10 due to a phase change of light.

The coarse-adjustment power source 102 and the fine-adjustment power source 103 apply voltages to the optical phase coarse adjuster 3A and the optical phase fine adjuster 3B based on a shift of an operating point of the optical modulator 10 which is confirmed with the monitor 104. In this connection, the voltages of the power sources 102 and 103 are equal to or lower than the voltage of the power source 101.

For this reason, the optical modulation device 100 does not necessarily include a high power source which is able to output a higher voltage than the voltage of the power source 101; hence, it is possible to achieve low power consumption. Thus, it is possible to produce the optical modulation device 100 at low cost without using an expensive high power source.

The present invention needs a simple operation to measure a shift of an operating point of the optical modulator 10 with the monitor 104, which is not necessarily limited in structure. Thus, it is possible to use a generally-known photo-diode monitor.

Next, an operating point control method will be described below. The operating point control method is used to control an operating point of an optical modulator via the following steps.

An optical branch step is carried out to branch the input light into two optical signals via two optical waveguides. An optical modulation step is carried out to apply a voltage to at least one optical waveguide so as to change an optical phase of an optical signal being guided by at least one optical waveguide. An optical coupling step is carried out to combine optical signals which are each changed in optical phase. A measurement step is carried out to monitor a shift of an operating point of an optical modulator with a monitor configured to monitor part of the combined light. An optical phase coarse adjustment step and an optical phase fine adjustment step are carried out to calibrate an operating point of an optical modulator based on a shift of an operating point measured with a monitor. It is possible to manually calibrate an operating point of an optical modulator. However, it is preferable to automatically calibrate an operating point of an optical modulator with a processor and a drive circuit. Specifically, the processor processes a shift of an operating point of an optical modulator measured with a monitor, and then the drive circuit automatically produces a voltage corresponding to a shift of an operating point. That is, the optical phase coarse adjustment step applies a voltage, below an operating voltage of a drive circuit, to an optical phase adjuster so as to change the optical phase of light by 180° or more, while the optical phase fine adjustment step applies a voltage, below an operating voltage of a drive circuit, to an optical phase adjuster so as to change the optical phase of light by 90° or less.

Due to the optical branch step, the input light of an optical modulator is branched into two optical signals with the same phase.

The optical modulation step is carried out to change an optical phase of at least one optical signal which is branched from the input light. An optical phase change occurs due to a change in a refractive index of an optical waveguide applied with a voltage. The optical coupling step recombines optical signals which are each changed in optical phase. It is possible to modulate the intensity of the output light due to a optical phase change. In other words, it is possible to replace an electric signal, based on the operating voltage of a drive circuit, with an optical signal. Since an optical phase difference occurring in the optical coupling step directly affects an optical signal output from an optical modulator, the optical modulation step may change the optical phases of two optical signals or the optical phase of one optical signal.

It is possible to detect an optical phase difference occurring in the optical modulation step by measuring part of the output light combined in the optical coupling step. Additionally, it is possible to measure a shift of an operating point of an optical modulator based on a shift between the naturally occurred phase difference and the measured phase difference of the output light. The above measurement is carried out such that the combined light is subjected to branching again so as to introduce part of the combined light to a photo-diode monitor.

As described above, it is possible to calibrate the measured shift of an operating point of an optical modulator by way of the optical phase coarse adjustment step and the optical phase fine adjustment step.

The optical phase coarse adjustment step is carried out to apply a voltage, below the operating voltage of a drive circuit in the optical modulation step, to an optical adjuster so as to change an optical phase of an optical signal by 180° or more. Additionally, the optical phase fine adjustment step is carried out to apply a voltage, below the operating voltage of a drive circuit in the optical modulation step, to an optical adjuster so as to change an optical phase of an optical signal by 90° or less. In short, the optical phase coarse adjustment step is able to calibrate a large shift of an operating point of an optical modulator, while the optical phase fine adjustment step is able to calibrate a small shift of an operating point of an optical modulator.

That is, it is possible to handle a large shift and a small shift occurring in an operating point of an optical modulator by simply applying a voltage, below the operating voltage of a drive circuit in the optical phase modulation step, to an optical phase adjuster.

Figure 12A:
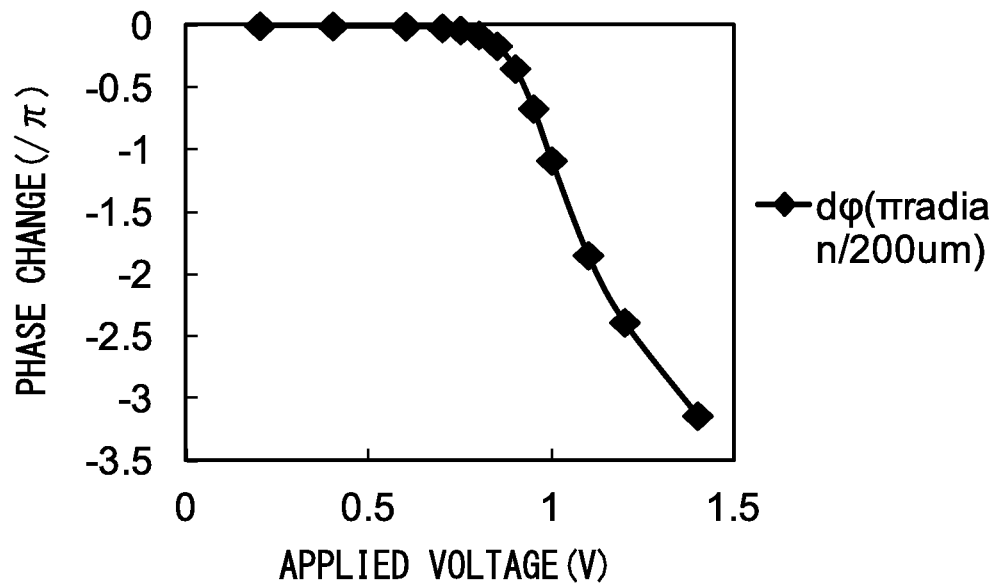
FIG. 12A shows characteristics of phase changes depending on applied voltages in a carrier injection silicon-base electro-optic element.
Figure 12B:
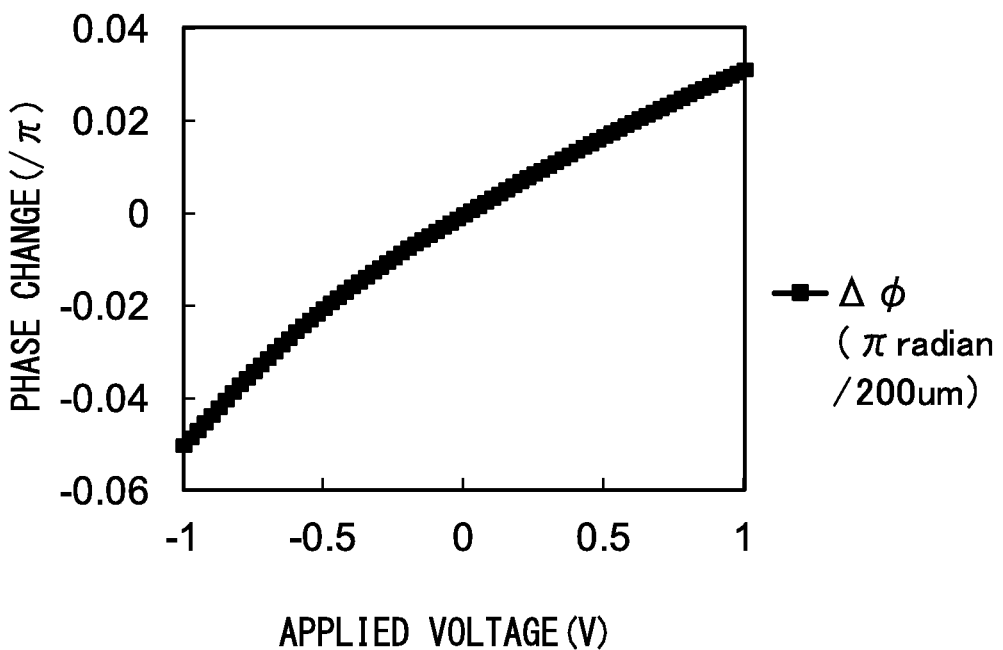
FIG. 12B shows characteristics of phase changes depending on applied voltages in an SIS junction silicon-base electro-optic element.
Figure 13:
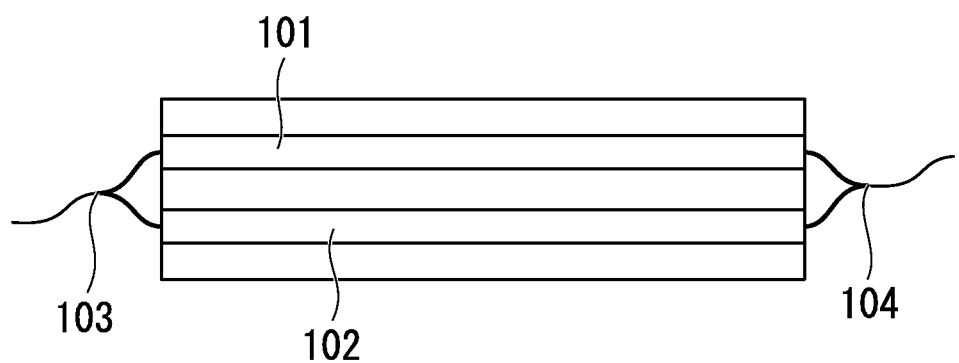
FIG. 13 is a schematic illustration showing an example of a optical modulator using a Mach-Zehnder interferometer.

Next, characteristics of phase changes depending on applied voltages in silicon-base electro-optic elements will be described with reference to graphs of FIGS. 12A and 12B. FIG. 12A shows characteristics of phase changes depending on applied voltages in the carrier injection silicon-base electro-optic element 50 shown in FIG. 6, while FIG. 12B shows characteristics of phase changes depending on applied voltages in the SIS junction silicon-base electro-optic element 20 shown in FIG. 3.

Specifically, a phase change of 180° or more occurs in the carrier injection silicon-base electro-optic element 50 having the length of 200 μm and applied with a voltage of 1.5 V. Only a phase change of 9° occurs in the SIS junction silicon-base electro-optic element 20 having the length of 200 μm and applied with a voltage of 1.5 V. The optical phase modulator 2 using a CMOS structure needs a drive circuit producing an operating voltage of 1.8V.

Therefore, it is possible to use the carrier injection silicon-base electro-optic element 50 for the optical phase coarse adjuster 3A while using the SIS junction silicon-base electro-optic element 20 for the optical phase fine adjuster 3B. The SIS junction silicon-base electro-optic element 20 demonstrates relatively linear phase changes, and therefore the electro-optic element 20 may effectively work to finely adjust phase changes.

Lastly, the present invention is not necessarily limited to the foregoing embodiments and examples, which can be further modified in various ways within the scope of the invention as defined in the appended claims.

What is claimed is:
1. An optical modulator comprising:
an optical branch structure which branches an input light into two optical signals via two arms;

an optical phase modulator which applies an operating voltage to at least one arm so as to modulate an optical phase of an optical signal transmitted via at least one arm;

an optical phase adjuster which applies a voltage below the operating voltage to at least one arm so as to adjust an operating point; and an optical coupling structure which combines optical signals output from the optical phase adjuster so as to produce an output light, wherein the optical phase adjuster includes an optical phase coarse adjuster and an optical phase fine adjuster, wherein the optical phase coarse adjuster applies a voltage below the operating voltage to at least one arm so as to change an optical phase of an optical signal transmitted via at least one arm by 180° or more, and wherein the optical phase fine adjuster applies a voltage below the operating voltage to at least one arm so as to changer an optical phase of an optical signal transmitted via at least one arm by 90° or less.

2. The optical modulator according to claim 1, wherein the two arms included in the optical phase modulator are each made of a silicon-base electro-optic element, wherein the silicon-base electro-optic element includes a substrate, a first conductive semiconductor layer having a rib waveguide structure which is formed in a rectangular shape to project in a direction opposite to the substrate, a dielectric layer deposited on the rib waveguide structure, and a second conductive semiconductor layer deposited on the dielectric layer, wherein the first conductive semiconductor layer is connected to a first electrode wire via a first contact part which is doped with first-conductive impurities at a higher density than other regions, wherein the second conductive semiconductor layer is connected to a second electrode wire via a second contact part which is doped with second-conductive impurities at a higher density than other regions, and wherein the first contact part is formed in a rectangular shape to project towards a slab of the first conductive semiconductor layer.

3. The optical modulator according to claim 1, wherein each of the two arms included in the optical phase adjuster includes the optical phase coarse adjuster and the optical phase fine adjuster.

4. The optical modulator according to claim 1, wherein one arm of the optical phase adjuster includes the optical phase coarse adjuster while another arm of the optical phase adjuster includes the optical phase fine adjuster.

5. The optical modulator according to claim 1, wherein an optical waveguide formed on each arm of the optical phase modulator is physically separated from an optical waveguide formed in each arm of the optical phase adjuster, and wherein the optical waveguides are connected together via a semiconductor material.

6. The optical modulator according to claim 5, wherein the optical waveguide of each arm of the optical phase modulator is directed towards the optical phase adjuster while a distal end thereof is shaped to project with a width equal to or less than a half wavelength of light, wherein the optical waveguide of each arm of the optical phase adjuster is directed towards the optical phase modulator while a distal end thereof is shaped to project with a width equal to or less than a half wavelength of light, and wherein the distal ends of the optical waveguides are disposed close to each other within a predetermined distance effusing evanescent waves.

7. An optical modulation device comprising the optical modulator as defined in any one of claims 1 to 6, the optical modulation device further including:

a power source configured to apply the operating voltage to the optical phase modulator of the optical modulator;

a coarse-adjustment power source configured to apply a voltage below the operating voltage to the optical phase coarse adjuster of the optical modulator;

a fine-adjustment power source configured to apply a voltage below the operating voltage to the optical phase fine adjuster of the optical modulator; and a monitor configured to monitor a shift of an operating point of the optical modulator in the output light.

8. An operating point control method adapted to an optical modulator, the method comprising:

causing an input light to be branched into two arms in the optical modulator;

applying an operating voltage to an optical waveguide formed in at least one arm of the optical modulator so as to change an optical phase of an optical signal transmitted through the at least one arm;

recombining optical signals undergoing phase changes while being transmitted through the two arms, thus outputting an output light;

measuring a shift of an operating point of the optical modulator by monitoring part of the output light;

applying a voltage below the operating voltage to the optical waveguide formed in the at least one arm so as to change an optical phase of an optical signal transmitted through the at least one arm by 180° or more, thus coarsely calibrating the operating point of the optical modulator based on the measured shift of the operating point; and applying a voltage below the operating voltage to the optical waveguide formed in the at least one arm so as to change an optical phase of an optical signal transmitted through the at least one arm by 90° or less, thus finely calibrating the operating point of the optical modulator based on the measured shift of the operating point.

* * * * *